(12) United States Patent
Clapp

(10) Patent No.: US 11,864,663 B2
(45) Date of Patent: ***Jan. 9, 2024

(54) QUICK RELEASE CONNECTOR

(71) Applicant: DEKA Products Limited Partnership, Manchester, NH (US)

(72) Inventor: Otis L. Clapp, Epping, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,130

(22) Filed: Nov. 28, 2022

(65) Prior Publication Data

US 2023/0148756 A1 May 18, 2023

Related U.S. Application Data

(63) Continuation of application No. 16/569,794, filed on Sep. 13, 2019, now Pat. No. 11,510,497.

(51) Int. Cl.
| | |
|---|---|
| *A47C 7/62* | (2006.01) |
| *F16B 3/00* | (2006.01) |
| *F16M 13/02* | (2006.01) |
| *A61G 5/10* | (2006.01) |

(52) U.S. Cl.
CPC ............... *A47C 7/62* (2013.01); *A61G 5/10* (2013.01); *F16B 3/00* (2013.01); *F16M 13/022* (2013.01)

(58) Field of Classification Search
CPC .... A47C 7/62; A61G 5/10; F16B 3/00; F16M 13/022; H01R 13/625

USPC ........... 248/220.21, 222.52, 220.22, 221.11, 248/221.12, 222.11, 222.13, 222.51, 248/223.31, 223.41, 224.8, 222.41, 248/223.21, 225.11

See application file for complete search history.

(56) References Cited

U.S. PATENT DOCUMENTS

| | | | |
|---|---|---|---|
| 810,243 A | 1/1906 | Wright | |
| 4,679,756 A * | 7/1987 | Wood | A61G 5/1094 403/92 |
| 6,663,064 B1 * | 12/2003 | Minelli | B60R 11/00 248/205.5 |
| 7,539,532 B2 | 5/2009 | Tran | |
| 7,673,838 B2 * | 3/2010 | Oddsen, Jr. | F16M 11/2064 248/225.11 |
| 7,877,145 B2 | 1/2011 | Russie | |
| 7,935,104 B2 | 5/2011 | Yodfat et al. | |
| 7,988,119 B2 | 8/2011 | Dittmer et al. | |
| 8,107,243 B2 | 1/2012 | Guccione et al. | |
| 8,231,403 B2 * | 7/2012 | Smith | H01R 13/625 439/529 |
| 8,352,041 B2 | 1/2013 | Das et al. | |

(Continued)

*Primary Examiner* — Christopher Garft
*Assistant Examiner* — Michael McDuffie
(74) *Attorney, Agent, or Firm* — William A. Bonk, III

(57) ABSTRACT

A quick release connector for coupling a removable device with a mounting surface. The mounting surface can include a wheelchair arm, and the removable device can include a user controller. The quick release connector can enable a user to briefly contact a release mechanism, rotate the removable device by a limited amount, and remove the device with a single hand. The quick release connector can robustly couple the removable device with the mounting surface, enabling the mounted removable device to resist dislodging by knocks and bumps.

9 Claims, 22 Drawing Sheets

(56) References Cited

U.S. PATENT DOCUMENTS

| | | |
|---|---|---|
| 8,465,221 B2 * | 6/2013 | Yan ..................... H05K 7/1489 |
| | | 403/348 |
| 8,480,629 B2 | 7/2013 | Yodfat et al. |
| 8,545,445 B2 | 10/2013 | Kamen et al. |
| 8,613,724 B2 | 12/2013 | Lanier et al. |
| 8,622,768 B2 | 1/2014 | Van Swearingen et al. |
| 8,641,672 B2 | 2/2014 | Yodfat et al. |
| 8,758,323 B2 | 6/2014 | Michaud et al. |
| 9,243,739 B2 * | 1/2016 | Peters ....................... A45F 5/00 |
| 9,532,474 B2 | 12/2016 | Gutschenritter et al. |
| 9,662,438 B2 | 5/2017 | Kamen et al. |
| 10,085,551 B2 | 10/2018 | Floersch et al. |
| 10,550,992 B2 * | 2/2020 | Yun ..................... B60R 11/0241 |
| 10,760,732 B1 * | 9/2020 | Koh ........................ F16M 13/02 |
| 11,159,663 B2 * | 10/2021 | Chen ...................... F16M 13/02 |
| 11,510,497 B2 * | 11/2022 | Clapp ...................... A61G 5/10 |
| 2011/0108692 A1 * | 5/2011 | Dittmer ................ F16M 11/041 |
| | | 248/220.21 |
| 2013/0065420 A1 * | 3/2013 | Van Swearingen .. H01R 13/625 |
| | | 439/372 |
| 2016/0212869 A1 * | 7/2016 | Gutschenritter ..... H05K 5/0221 |
| 2018/0235362 A1 * | 8/2018 | Floersch ............ F16M 11/2014 |

* cited by examiner

4350

START

MANUFACTURE A MOUNT PLATE WITH COUPLING MEANS FOR OPERABLY COUPLING THE MOUNT PLATE WITH THE MOUNTING SURFACE, THE MOUNT PLATE INCLUDING A FIRST ALIGNMENT NOTCH, THE MOUNT PLATE HAVING A FIRST END GEOMETRICALLY ACCOMMODATING THE MOUNTING SURFACE AND THE MOUNT PLATE HAVING A SECOND END GEOMETRICALLY ACCOMMODATING THE REMOVABLE DEVICE 4351

MANUFACTURE A LATCH COG HAVING A PLURALITY OF MOUNT TABS SURROUNDING A CIRCULAR FEATURE, AT LEAST ONE OF THE PLURALITY OF MOUNT TABS INCLUDING A COG PIN DEPRESSION, AT LEAST ONE OF THE PLURALITY OF MOUNT TABS KEYED TO ENABLE A PRE-SELECTED ORIENTATION OF THE REMOVABLE DEVICE WITH RESPECT TO THE MOUNTING SURFACE 4353

REMOVABLY COUPLE THE LATCH COG TO THE SECOND END 4355

MANUFACTURE A LATCH PLATE HAVING A PLURALITY OF RECESSES SIZED TO ACCOMMODATE THE PLURALITY OF MOUNT TABS, AT LEAST ONE OF THE PLURALITY OF RECESSES HAVING A PLATE PIN DEPRESSION, AT LEAST ONE OF THE PLURALITY OF RECESSES KEYED TO ACCOMMODATE THE AT LEAST ONE KEYED MOUNT TAB 4357

MANUFACTURE A RELEASE LEVER HAVING A PIN, THE RELEASE LEVER HAVING A SPRING SEATED IN A DEPRESSION IN THE RELEASE LEVER, THE RELEASE LEVER HAVING A RELEASE LEVER BODY AND COUPLING FEET 4359

MANUFACTURE A TOP MOUNT HAVING A THIRD PIN DEPRESSION, THE TOP MOUNT GEOMETRICALLY ACCOMMODATING THE RELEASE LEVER BODY AND THE COUPLING FEET, THE COUPLING FEET BEING ROTATABLY COUPLED TO THE TOP MOUNT, THE TOP MOUNT INCLUDING A FIRST ATTACHMENT MEANS REMOVABLY COUPLING THE REMOVABLE DEVICE TO THE TOP MOUNT 4361

QUICK RELEASE CONNECTOR

CROSS-REFERENCE TO RELATED APPLICATIONS

This application is a continuation of U.S. patent application Ser. No. 16/569,794, filed Sep. 13, 2019, entitled "Quick Release Connector", which is incorporated herein by reference in its entirety.

BACKGROUND

The present disclosure pertains to connectors, and more particularly to quick release connectors.

Devices that are advantageously operably coupled semi-permanently and robustly with other devices can pose a problem when it is required to separate the devices. Devices such as joysticks and toggle switches can include sensitive technology that may not survive, for example, baggage handling when attached to a host device. Devices such as cell phones may require a robust coupling that can withstand bumps and knocks, but also may require frequent disconnecting from a host device.

For example, a user controller attached to the arm of a wheelchair may protrude from the arm of the wheelchair. When the wheelchair is folded for transport, for example in an airplane luggage compartment or in the trunk of a car, the protruding user controller could become damaged simply because it does not align with the general contours of the folded wheelchair. Replacing the damaged user controller could be expensive and possibly unrealistic, depending upon the travel destination, and could at least cause inconvenience for the traveling user. One solution is to remove the user controller from the wheelchair before stowing the wheelchair. In another example, a cell phone mounted within a vehicle may be an easy target for theft if left mounted in the vehicle when the occupants are elsewhere.

In both of these cases, the removable device should be robustly attached to the host to insure that the removable device does not become compromised when knocked or bumped. A robust connection often involves tools for removal, for example, when screws are used to make the coupling, a screwdriver is necessary to decouple the device from the host. Non-tool decoupling can be accomplished by threaded connectors, magnets, push-button release features, and other connection options. Each of these possibilities can present either a lack of a robust connection or a slow disconnect, or both. What is needed is a coupling that requires little coordination on the part of the user to decouple a mounted device from its mounting surface and allows a quick removal of the removable device, at the same time providing a robust connection while the removable device is coupled to the mounting surface.

SUMMARY

In accordance with some configurations, a quick release connector is disclosed.

The aspects of the present teachings presented herein are not meant to be exclusive, and other features, aspects, and advantages of the present teachings will be readily apparent to those of ordinary skill in the art when read in conjunction with the appended claims and accompanying drawings.

In accordance with one configuration of the present teachings, a quick release connector is disclosed. The quick release connector can include, but is not limited to including coupling means for coupling the connector to a mounting surface and to a removable device, and a release means between the coupling means. In some configurations, the quick release connector of the present teachings for coupling a connected device with a mounting surface can include, but is not limited to including, a mount plate with coupling means for operably coupling the mount plate with the mounting surface. The mount plate can include at least one first alignment notch, a first end whose geometry can accommodate the mounting surface, and a second end whose geometry can accommodate the removable device. The mount plate can include at least one alignment feature that can enable quick and accurate alignment with a latch cog. The quick release connector can include the latch cog that can include a plurality of mount tabs surrounding a circular feature. At least one of the mount tabs can include a cog pin cavity that can receive and retain a cog pin that can discontinue rotational movement of the quick release connector and the removable device. At least one of the mount tabs can optionally be keyed. The keyed feature can enable the removable device to be mounted at a pre-selected orientation with respect to the mounting surface. The latch cog can be removably coupled to the second end at the circular feature. The latch cog can optionally include alignment features that can mate with the alignment features of the mount plate.

The quick release connector can include a latch plate that can include a plurality of recesses sized to accommodate the mount tabs. At least one of the plurality of recesses can include a plate pin depression that can allow a pin to pass through the latch plate and seat in the notch in the cog pin cavity. At least one of the plurality of recesses can optionally be keyed to accommodate easy placement of the removable device at a correct orientation, coupled with the at least one keyed mount tab. The latch plate can include floors and roofs associated with the recesses that can secure the mount tabs vertically. The latch plate can include walls associated with the recesses that can secure the mount tabs horizontally on one side. The pin can serve to disable rotation of the removable device when it is seated in the notch in the latch cog tab.

The quick release connector can include a release lever that can include the pin discussed herein that can, when seated, disable rotation of the removable device. The release lever can include a spring that can be seated in a depression in the release lever. The release lever can include a release lever body and coupling feet. The release lever body can provide surfaces for both the spring recess and attachment of the pin. The coupling feet can enable rotation of the release lever.

The quick release connector can include a top mount that can include a third pin depression. The top mount can include a geometry that can accommodate the release lever body and the coupling feet. The coupling feet can be rotatably coupled to the top mount, and the top mount can include a first attachment means that can removably couple the removable device to the top mount. The quick release connector can include a spring cap that can include a second attachment means. The second attachment means can couple the spring cap, the removable device, and the top mount. The spring cap can provide a recess into which the depressed spring can reside when the removable device is seated atop the top mount and spring cap.

The mount plate and the top mount can both optionally include a wire channels that can constrain the movement of a wire that might be providing a conduit for power and data between the removable device and a processor. The mounting surface can optionally include a seat arm or any part of a seating device. The mounting surface can optionally include a wheelchair component, for example, a wheelchair arm.

The method of the present teachings for coupling a removable device and a mounting surface using a quick release connector can include, but is not limited to including, setting the removable device upon a spring cap and a top mount. The spring cap can cover a spring attached to a release lever, and the release lever can include a pin. The spring can be compressed by the removable device. The release lever can be operably coupled with the top mount, the top mount can be operably coupled with a latch plate, the latch plate can be operably coupled with a mount plate, and the mount plate can be operably coupled with the mounting surface. The method can include aligning a first alignment notch on the latch plate with a second alignment notch on the mount plate, setting the latch plate atop a latch cog and the mount plate when the first alignment notch and the second alignment notch are aligned, and rotating the removable device until the pin drops into a pin notch. The pin notch can be found on the latch cog. The method can optionally include rotating the removable device by about 30°.

The method of the present teachings for decoupling a removable device from a mounting surface using a quick release connector can include, but is not limited to including, moving a release lever towards the removable device that is mounted upon a spring cap and a top mount. The release lever can compress a spring against a spring cap. The method can include rotating the removable device so that a first alignment notch on a latch plate aligns with a second alignment notch on a mount plate. The latch plate can be operably coupled with the top mount and the removable device. The method can include lifting the removable device from the mount plate. The method can optionally include rotating the removable device about 30°.

The method of the present teachings for building a quick release connector for coupling and decoupling a removable device from a mounting surface can include, but is not limited to including, manufacturing a mount plate with coupling means for operably coupling the mount plate with the mounting surface. The mount plate can include a first alignment notch, a first end that can include a geometry that can accommodate the mounting surface, and a second end that can include a geometry that can accommodate the removable device. The method can include manufacturing a latch cog that can include a plurality of mount tabs that can surround a circular feature. At least one of the mount tabs can include a cog pin depression. At least one of the mount tabs can optionally be keyed to enable a pre-selected orientation of the removable device with respect to the mounting surface. The method can include removably coupling the latch cog to the second end, and manufacturing a latch plate that can include a plurality of recesses sized to accommodate the mount tabs. At least one of the plurality of recesses can include a plate pin depression, and at least one of the plurality of recesses can optionally be keyed to accommodate the at least one optional keyed mount tab. The method can include manufacturing a release lever that can include a pin. The release lever can include a spring that can be seated in a depression in the release lever. The release lever can include a release lever body and coupling feet. The method can include manufacturing a top mount that can include a third pin depression. The top mount can include a geometry that can accommodate the release lever body and the coupling feet. The coupling feet can be rotatably coupled to the top mount, and the top mount can include a first attachment means that can removably couple the removable device to the top mount. The method can include manufacturing a spring cap that can include a second attachment means that can couple the spring cap with the removable device. The spring cap can depress the spring when the removable device is seated atop the top mount and the spring cap. The mount plate and the top mount can optionally each include wire channels. The mounting surface can optionally include a wheelchair surface.

BRIEF DESCRIPTION OF THE DRAWINGS

The foregoing features of the disclosure will be more readily understood by reference to the following description, taken with reference to the accompanying drawings, in which:

FIG. 2 is a group of perspective diagrams of the top mount of the present teachings;

FIGS. 11A-11B are flowcharts of the method for building the quick release connector of the present teachings;

DETAILED DESCRIPTION

Figures 1, 1A:
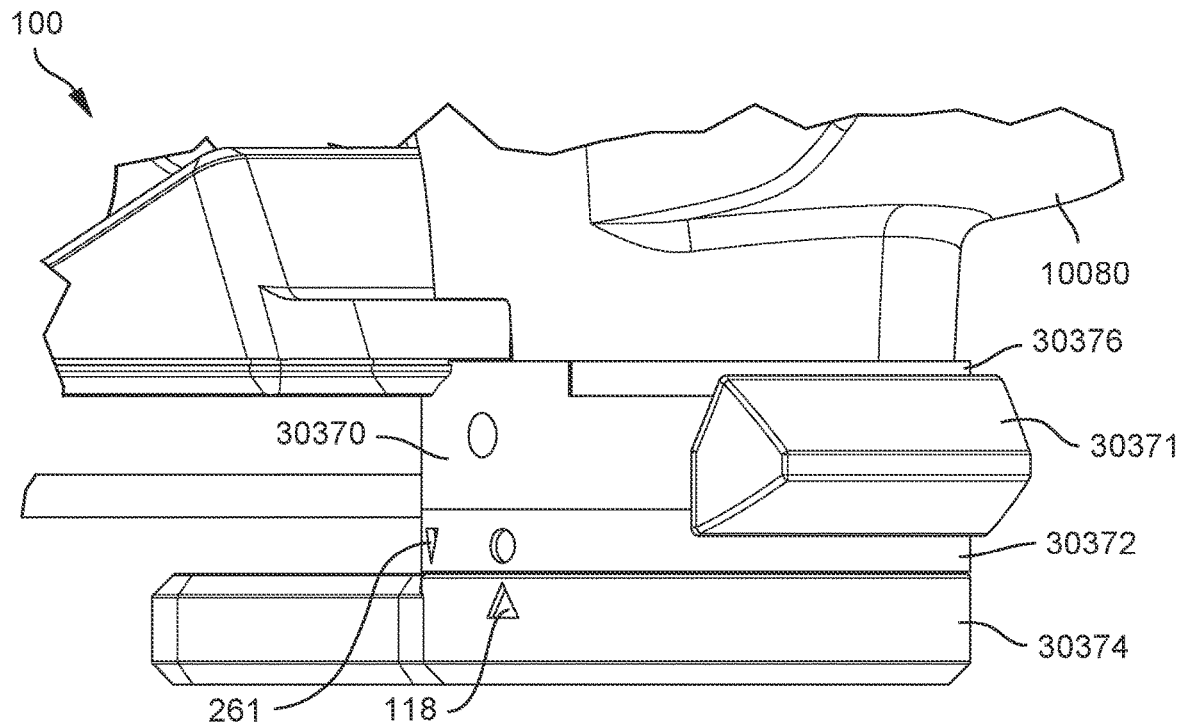
FIGS. 1A-1 through 1B-2 are perspective diagrams of quick release connector of the present teachings in use.

Any headings provided herein are for convenience only and do not affect the scope or meaning of the present disclosure. A vehicle, as used throughout, unless otherwise specified, includes, but is not limited to, a personal vehicle, such as a wheelchair.

Referring now to FIGS. 1A-1D and FIGS. 12-18, quick release connector 100 for providing a robust connection and quick decoupling between removable device 10080 and a mounting surface can include, but is not limited to including, spring cap 30376, release lever 30371, top mount 30370, latch plate 30372, latch cog 30373 (FIG. 1B-2), and mount plate 30374. Removable device 10080 can include, but is not limited to including, a user control device. The user control device can be electronically coupled with a processor that can convert user commands received by the user control device into commands to, for example, enable movement of a device such as, for example, but not limited to, a mobile transporter. The mounting surface can include, but is not limited to including, a surface associated with the device being moved, such as, for example, but not limited to, a surface of the mobility device. In some configurations, the mobility device can include an electric wheelchair, and the mounting surface can include an arm of the seat of the wheelchair. Mount plate 30374 can include coupling means 117 (FIGS. 1C, 1D) for operably coupling mount plate 30374 with the mounting surface, and coupling means 225 for operably coupling mount plate 30374 with removable device 10080. Mount plate 30374 can include second alignment notch 118, first end 221, and second end 223. First end 221 can include a geometry accommodating the shape of the mounting surface, while second end 223 can include a geometry accommodating the shape of removable device 10080.

Continuing to refer to FIGS. 1A-1D and FIGS. 12-18, latch cog 30373 can include a plurality of mount tabs 227 that can surround circular feature 229. At least one of mount tabs 227 can include cog pin cavity 101 that can admit cog pin 231 (FIG. 1C) when removable device 10080 is in a seated position. At least one of mount tabs 227 can be keyed mount tab 227A that can enable removable device 10080 to be seated at a pre-selected orientation with respect to the mounting surface. Mount plate 30374 can include attachment cavity 119 that can enable removable fastening of circular feature 229 to second end 223. The removable fastener can include, but is not limited to including, one or more bolts, magnets, glue, hook-and-eye strips, tape, screws, and nails. Latch plate 30372 can include a plurality of recesses 235 sized to accommodate mount tabs 227. At least one of plurality of recesses 235 can include plate pin cavity 237, and at least one of the plurality of recesses 235 can be keyed recess 239 that can accommodate at least one keyed mount tab 227A. Recesses 235 and keyed recess 239 can enable the placement and robust coupling of the combination of latch plate 30372, top mount 30370, and removable device 10080 with mount plate 30374 and latch cog 30373.

Figures 1, 1A, 2:
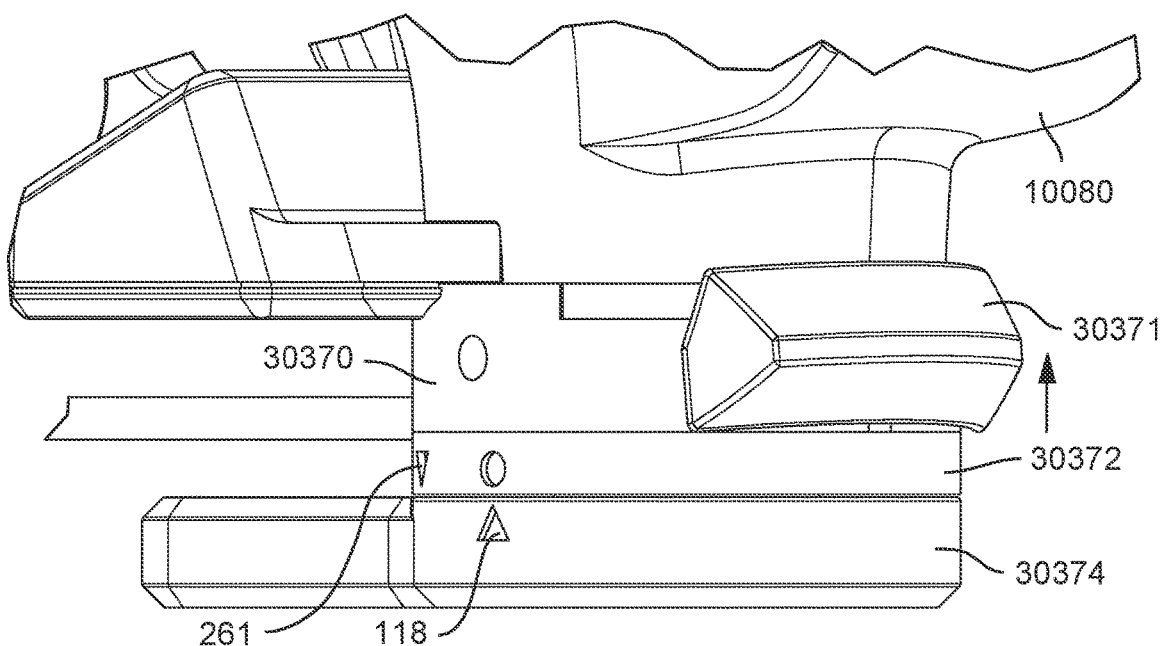
Figures 1, 1B:
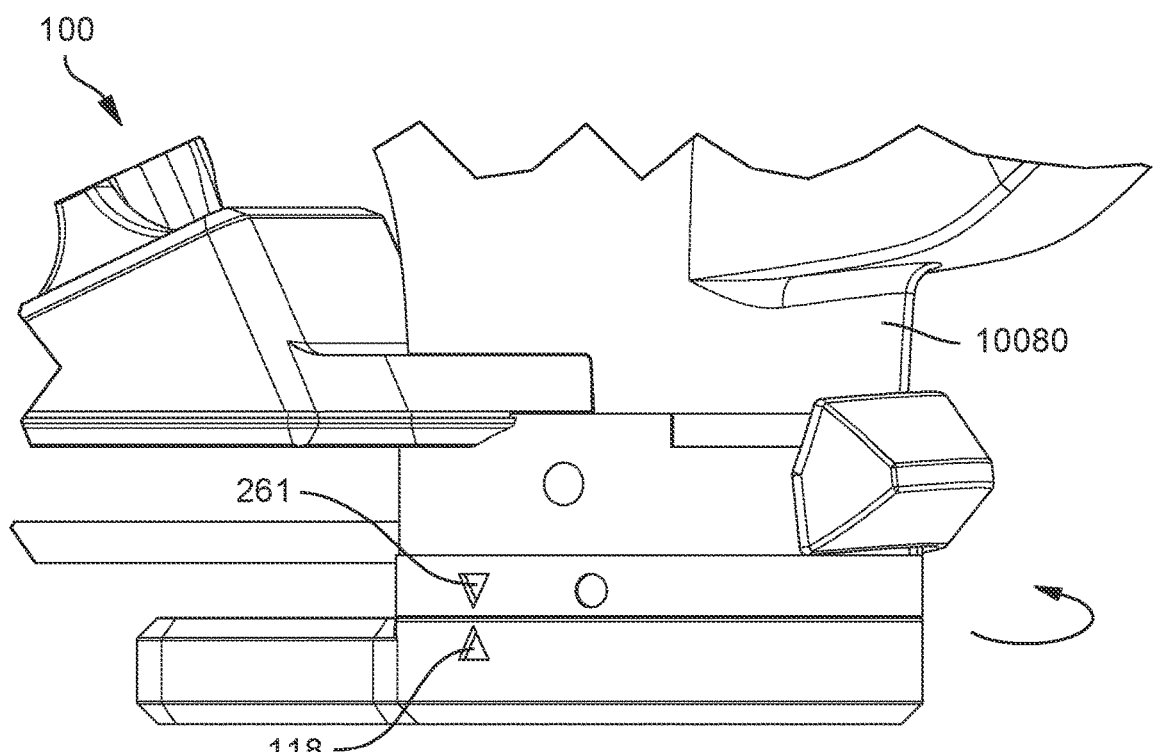
Figures 1, 1B, 2:
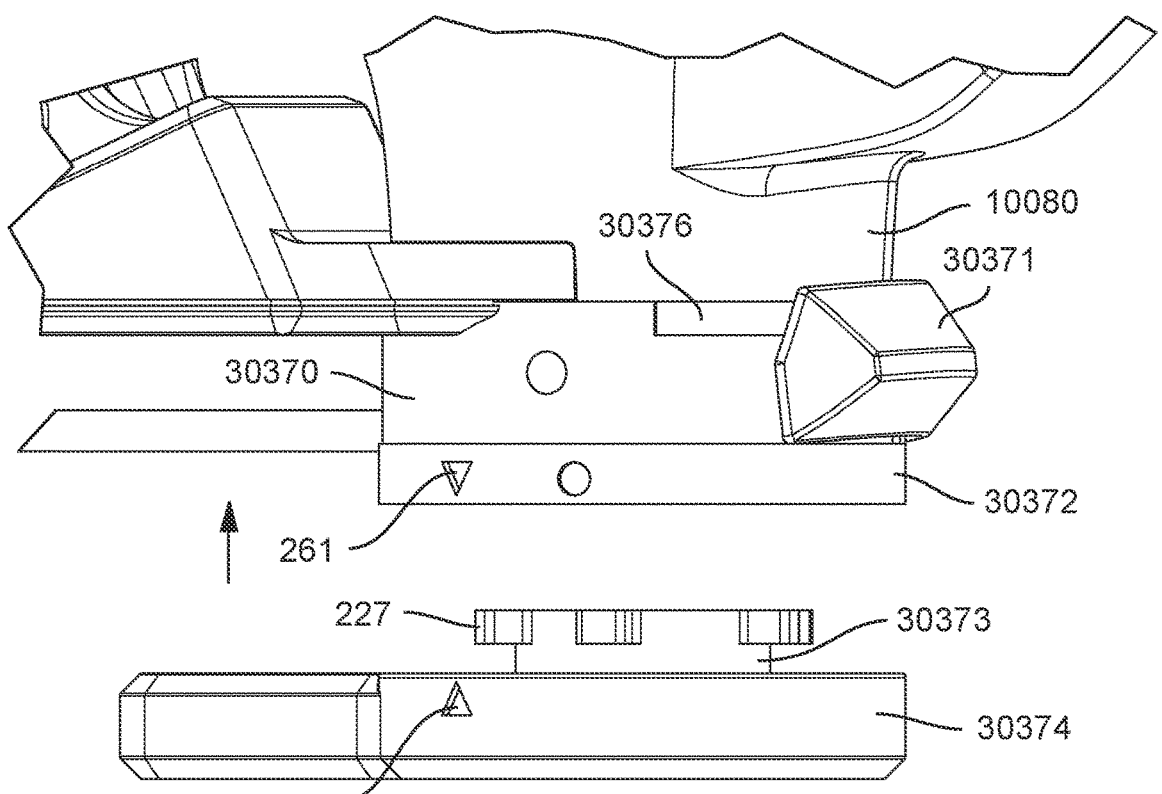
Figure 1C:
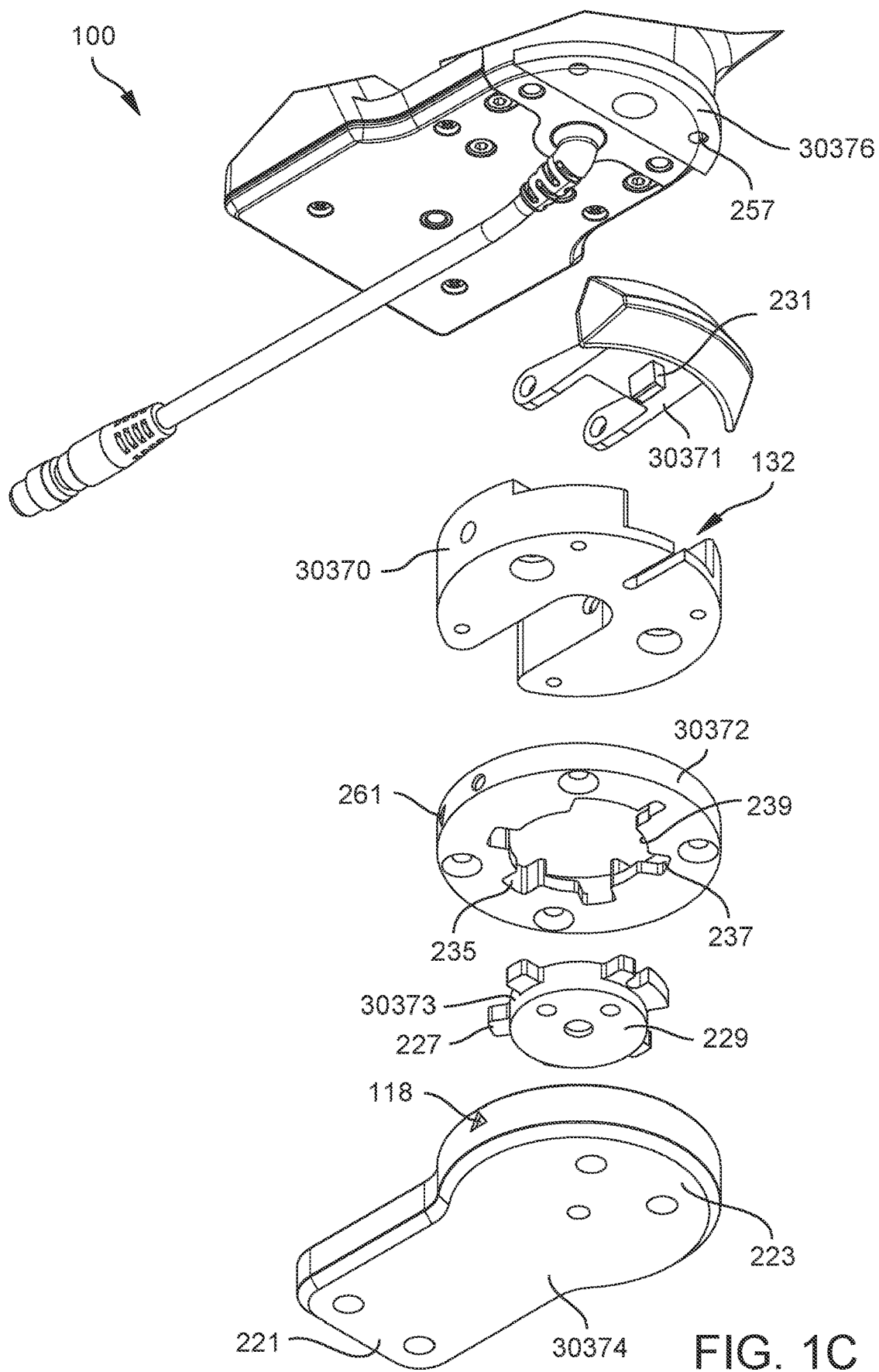
FIGS. 1C-1D are perspective exploded diagrams of the quick release connector of the present teachings.
Figure 1D:
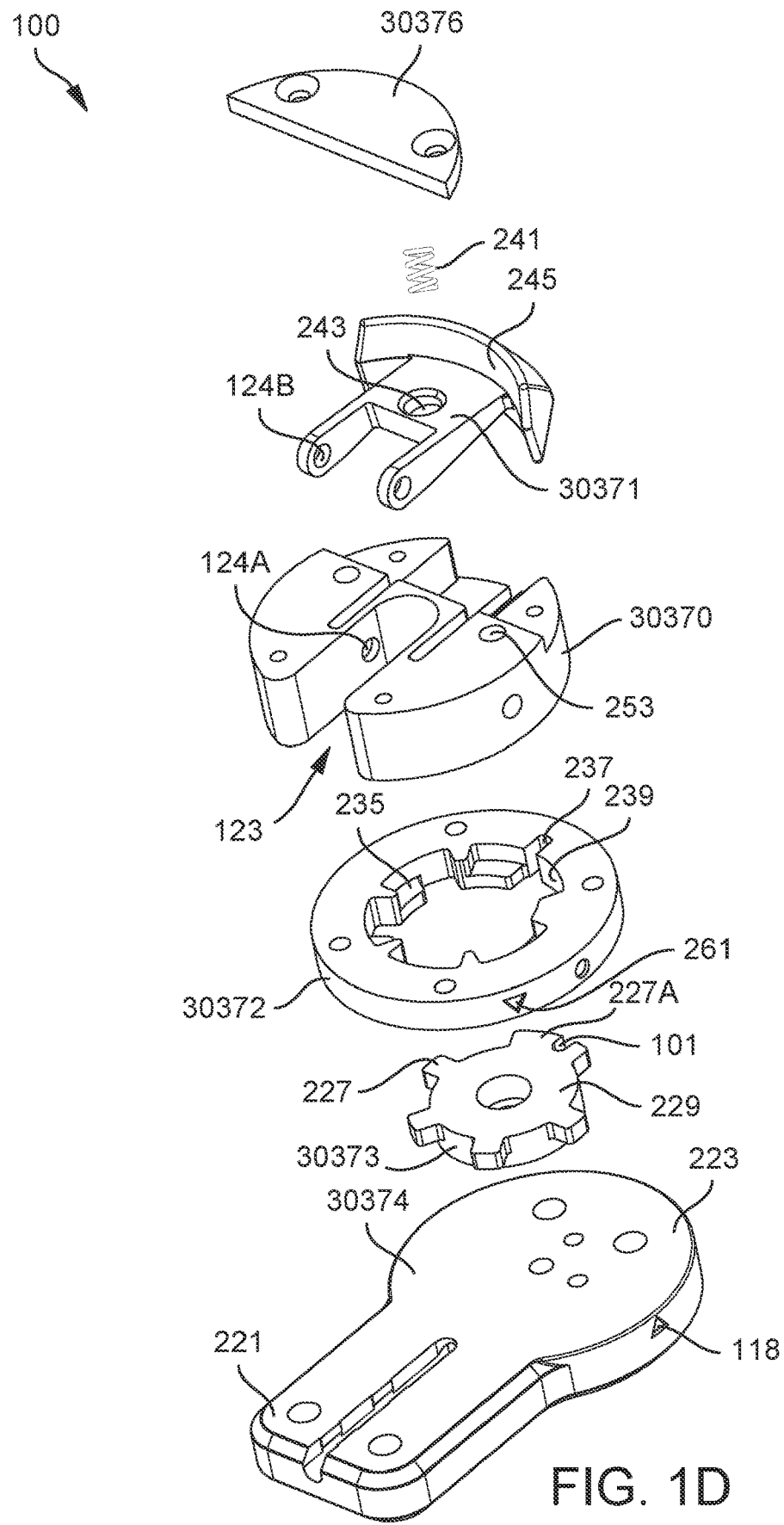
Figure 2:
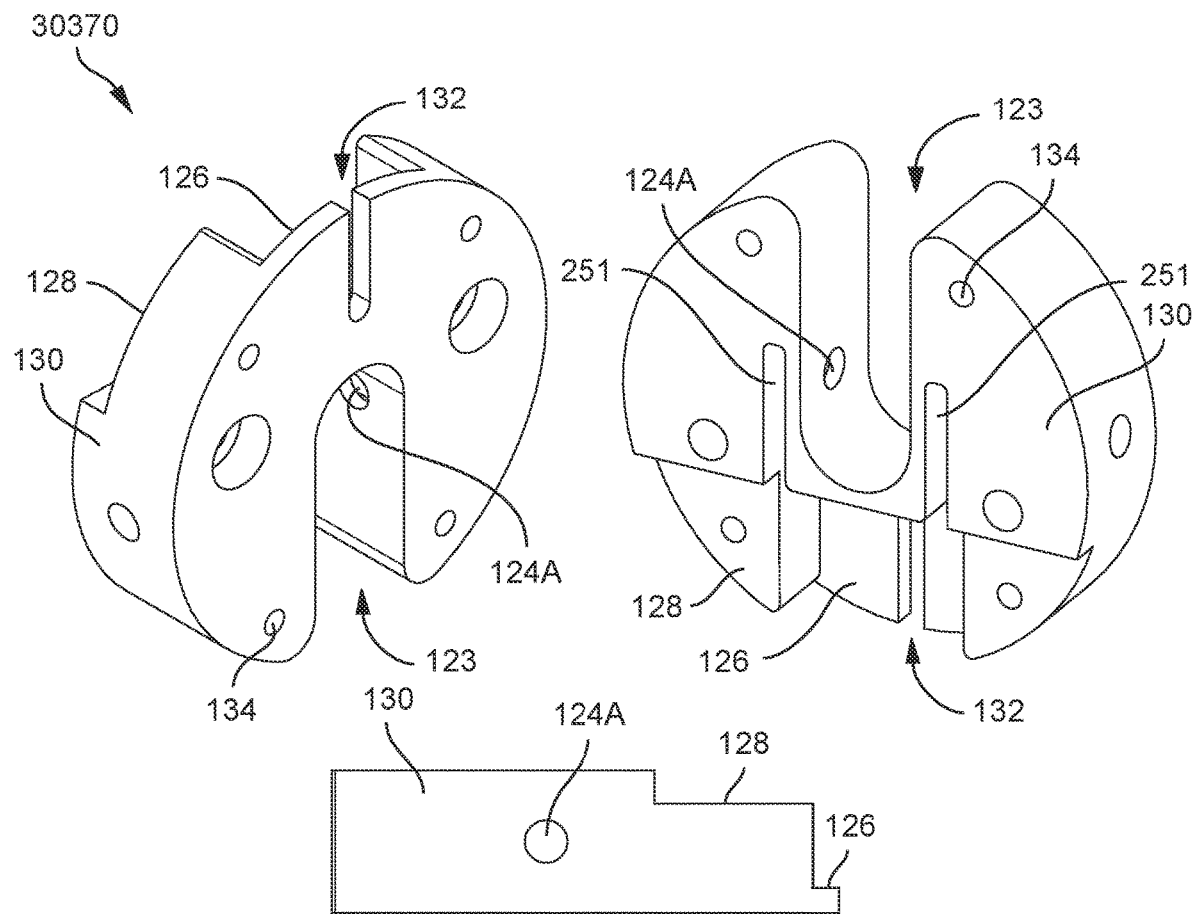
Figure 2:
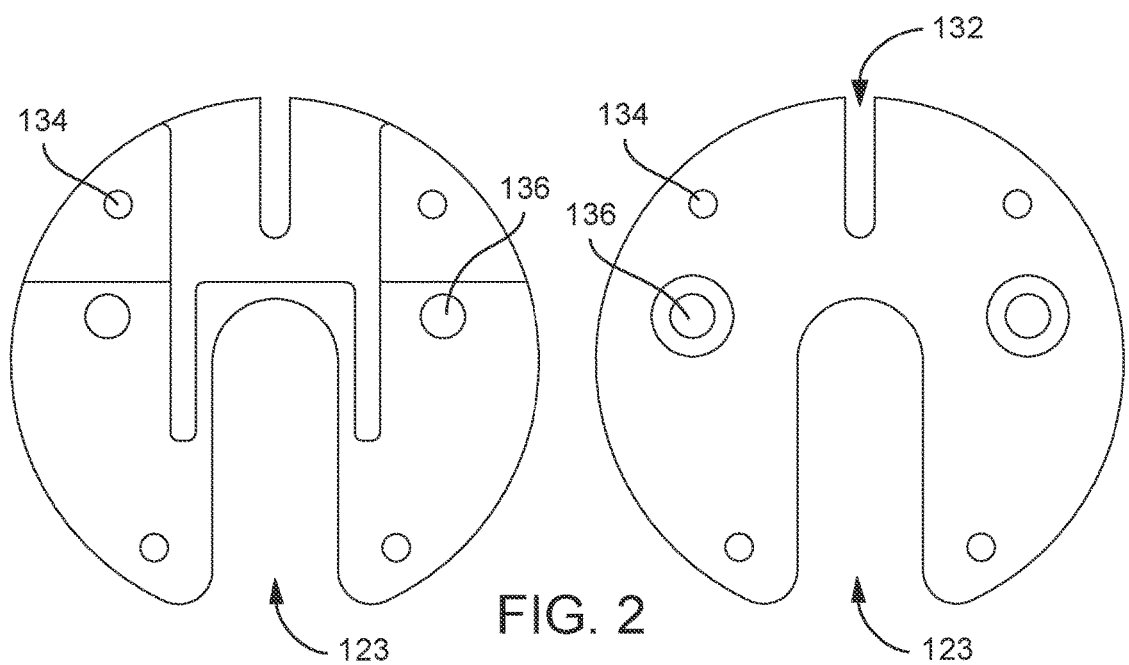

Continuing to refer to FIGS. 1A-1D and FIGS. 12-18, release lever 30371 can include pin 231 (FIG. 1C) that can seat in plate pin cavity 237 and cog pin cavity 101. Pin 231 (FIG. 1C) can retain the position of removable device 10080 after latch plate 30372 has been rotated. Release lever 30371 can include spring 241 (FIG. 1D) seated in spring depression 243 near release lever handle 245. Spring 241 (FIG. 1D) can exert pressure against removable device 10080 to increase the stability of the coupling of removable device 10080 to the mounting surface. Release lever 30371 can include release lever handle 245 and coupling feet 247. Release lever handle 245 can enable a user to remove removable device 10080 by disengaging pin 231 (FIG. 1D) from latch cog 30373 with a displacement of release lever handle 245 from a seated position to a release position. Displacing release lever handle 245 can enable spring 241 to place pressure on spring cap 30376, thereby preparing removable device 10080 to be rotated and ejected from mount plate 30374. Top mount 30370 can include third pin depression 132 (FIG. 1C) for accommodating pin 231 (FIG. 1D) when removable device 10080 is seated. Top mount 30370 can include a geometry that can accommodate release lever handle 245 and coupling feet 247. Release lever handle 245 can rest on shelf 126 (FIG. 2), and coupling feet 247 can rotate into and out of slits 251 (FIG. 2). Coupling feet 247 can be rotatably coupled to top mount 30370 at recesses 124A/B (FIG. 1D). The rotatable coupling can enable pin 231 (FIG. 1D) to be seated and removed when release lever handle 245 is displaced. Top mount 30370 can include attachment cavity 253 (FIG. 1D) that can removably couple removable device 10080 to top mount 30370. Spring cap 30376 can include second attachment cavities 257 that can removably couple spring cap 30376 with removable device 10080. The coupling can be fixed as well. Spring cap 30376 can depress spring 241 (FIG. 1D) when removable device 10080 is seated atop top mount 30370 and spring cap 30376.

Referring again to FIGS. 1A-1 through 1B-2, in operation, removable device 10080 can be decoupled from a mounting surface by displacing release lever 30371 (seen FIGS. 1A-1 and 1A-2) towards removable device 10080, where removable device 10080 is mounted upon spring cap 30376 and top mount 30370, and where release lever 30371 is compressing spring 241 (FIG. 1D) against spring cap 30376. After release lever 30371 is displaced, decoupling removable device 10080 can include rotating removable device 10080 (See FIG. 1B-1) so that first alignment notch 261 on latch plate 30372 can align with second alignment notch 118 on mount plate 30374, where latch plate 30372 can be operably coupled with top mount 30370 and removable device 10080. After rotating removable device 10080, removable device 10080 can be lifted (See FIG. 1B-2) from mount plate 30374. When removable device 10080 is decoupled from mount plate 30374, removable device 10080 can be stored in a container that can protect it from travel-related mishaps, for example. During travel, for example, airline or bus travel, if removable device 10080 enables user control of a mobility device, for example, removable device 10080 can be removed from the mobility device and placed in carry-on luggage while the mobility device can be folded and stored with checked luggage.

Referring now to FIG. 2, top mount 30370 can optionally include wire cavity 123 for use when removable device 10080 includes a wired connection to, for example, a processor. Top mount 30370 can include a plurality of shelves 126/128/130 that can accommodate the seating of a variety of sizes and shapes of release level handles 245 and coupling feet 247. The surface that faces an underside of removable device 10080 and is formed by top mount 30370 and release lever 30371 can include a shape that can result in flush coupling of top mount 30370 and release lever 30371 with removable device 10080 and spring cap 30376. Therefore, the geometry of top mount 30370 coupled with release lever 30371 can depend upon the geometry of removable device 10080 coupled with spring cap 30376. Recesses 134 can enable coupling between top mount 30370 and latch plate 30372. Recesses 136 can enable coupling between the removable device and mount plate 30370. Top mount 30370 can be shaped to accommodate the removable device.

Figure 3:
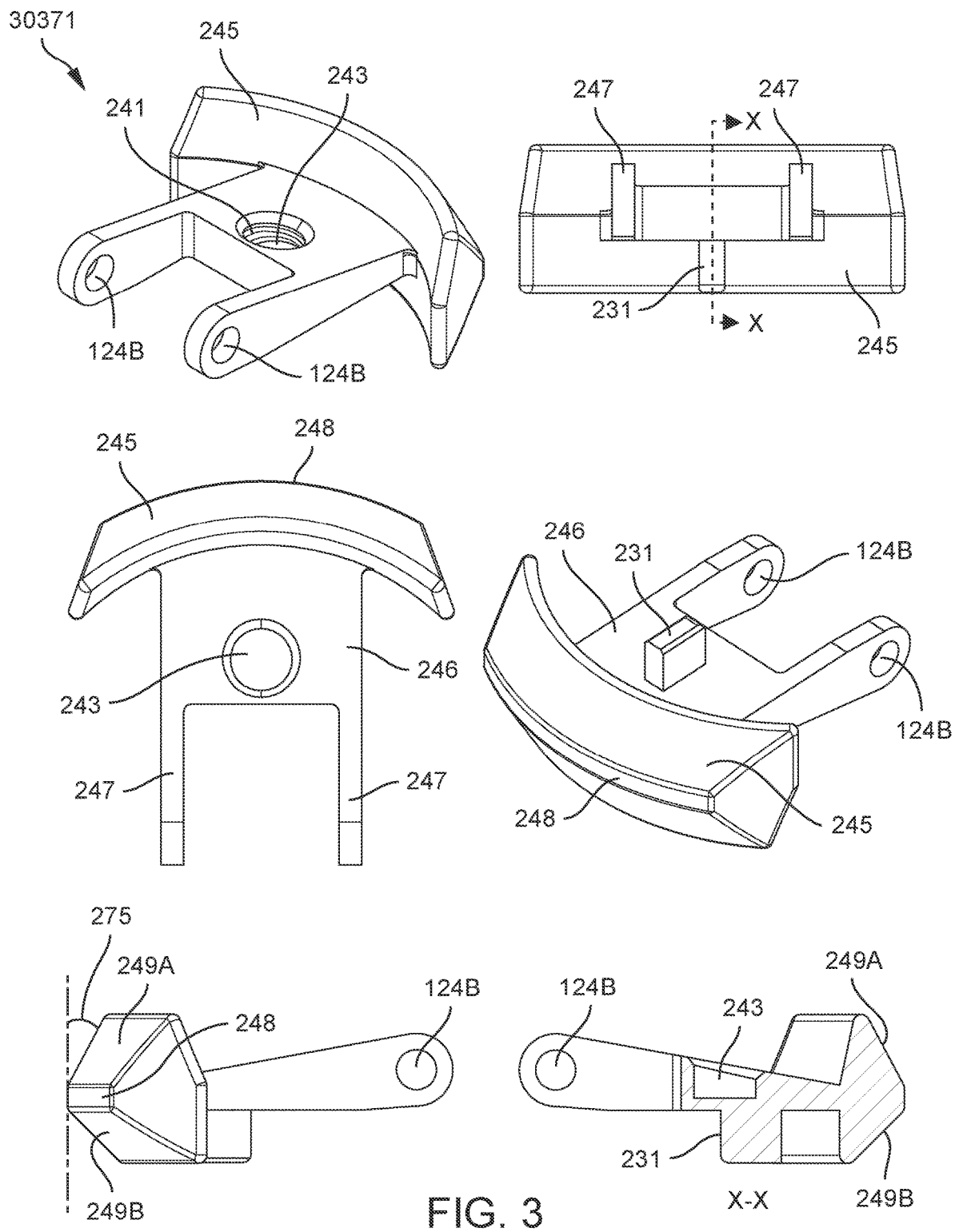
FIG. 3 is a group of perspective diagrams of the release lever of the present teachings.

Referring now to FIG. 3, release lever 30371 can include handle 245, body 246, and coupling arms 247. Handle 245 can include angled sides 249A/B that can enable a simple nudge to begin rotation of release lever 30371, and ultimately the decoupling of removable device 10080 from the mounting surface. In some configurations, handle 245 can include protrusion 248 forming the apex of a triangle whose sides 249A/B form angle 275 with the vertical. The larger angle 275, the more release lever 30371 protrudes into space away from release connector 100 and removable device 10080. The selection of angle 275 can be based on a desired footprint of the removable device with respect to the mounting surface, and a desired strike plate geometry formed by angles sides 249A/B. In some configurations, a relatively large strike plate might be desired, such as when the removable device will be removed by a person with certain physical disabilities. In some configurations, a relatively smooth surface between removable device 10080 and the mounting surface might be desired, such as when removable device 10080 might be routinely subjected to certain kinds of forces. In some configurations, a balance among the described needs and possibly other considerations can result in an angle in the range of about 25-30°.

Continuing to refer to FIG. 3, body 246 can include edge depression 243 on a first side. Edge depression 243 can house spring 241 that can enable a pressured connection between release lever 30371 and spring cap 30376. Edge depression 243 can optionally include a chamfered recess. Edge depression 243 can be sized according to a desired spring physical size based on desired spring characteristics. The position of edge depression 243 on body 246 with respect to coupling arms 247 can depend on the force that body 246 is expected to withstand and the positioning of spring cap 30376. The larger the force, the more a centered positioning of edge depression 243 might be desired. Other considerations could include the positioning of pin 231 on a second side of body 246. The second side of body 246, being the reverse side of the first side, can include pin 231. Pin 231 can extend from body 246 to a distance about equal to the distance reached by side 249B, or a distance long enough to extend through top mount 30370, latch plate 30372, and latch cog notch 101. The size of pin 231 can depend upon the expected lateral and normal forces on pin 231 as removable device 10080 is coupled and decoupled with the mounting surface, and as removable device 10080 is subjected to the forces of daily use.

Continuing to refer to FIG. 3, coupling arms 247 can be operably coupled with body 246, and can provide rotation of release lever 30371. Operably coupling between body 246 and coupling arms 247 can be the result of single component manufacturing, or fastening multiple components together. Coupling arms 247 can each include coupling cavities 124B that can enable fastening of coupling arms 247 to top mount 30370. Fastening means can include screws, bolts, nails, and any device or geometry that can enable rotation.

Figure 4:
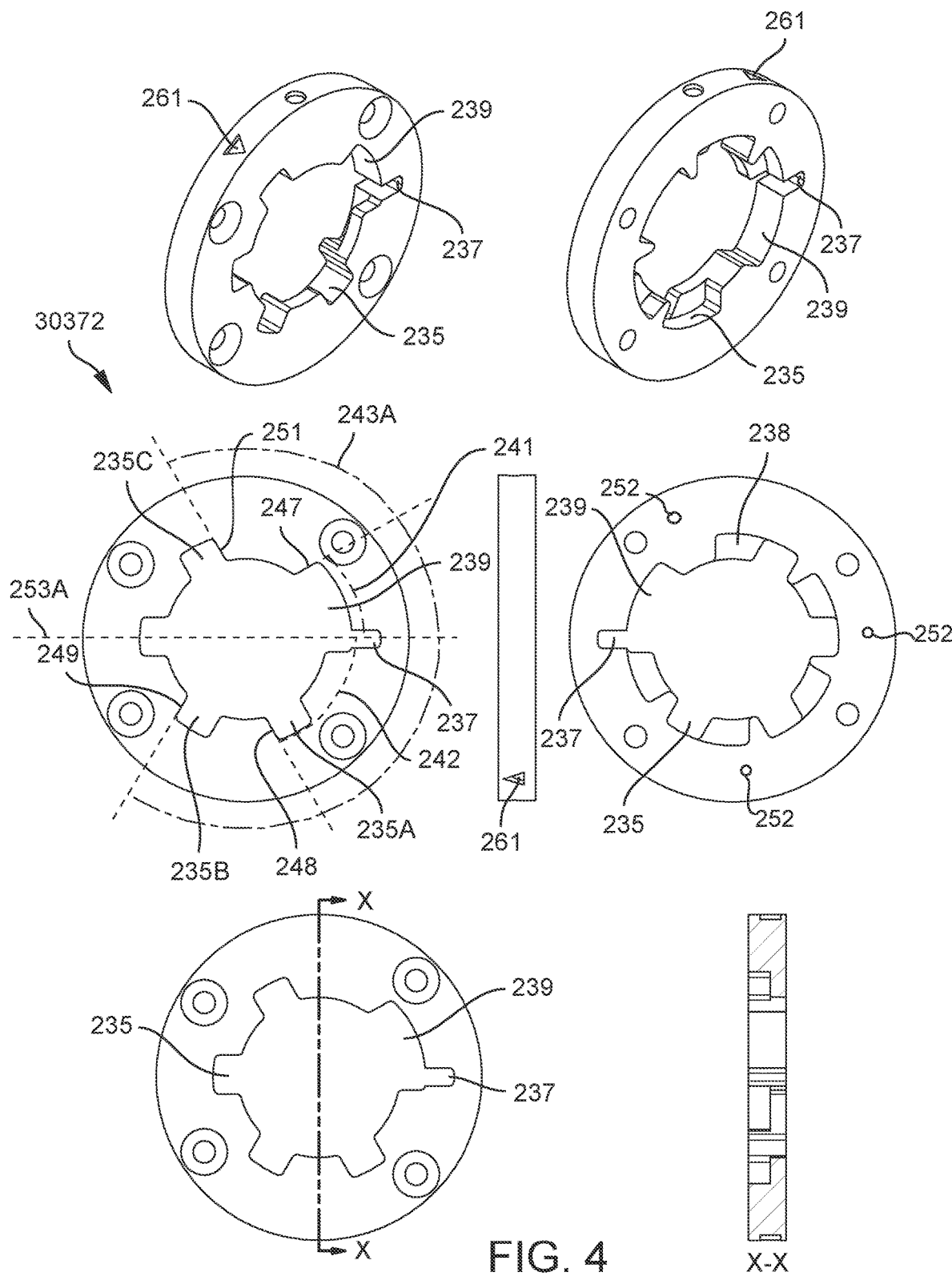
FIG. 4 is a group of perspective diagrams of the latch plate of the present teachings.

Referring now to FIG. 4, latch plate 30372 can enable secure coupling of removable device 10080 onto mount plate 30374. Latch plate 30372 can include at least one tab recess 235 and at least one tab seat 238. At least one tab recess 235 can be large enough to accept tab 227, and can include a passage to at least one tab seat 238. Tab seat 238 can include a tab rest area, a tab wall, and a tab roof, and can be sized to accept tab 227 onto the tab rest area and under the roof. When tab 227 is positioned in tab recess 235, a rotation of removable device 10080 can move tab 227 into tab seat 238, and tab 227 can be held in place from vertical movement between the tab rest area and the tab roof. Tab 227 can be inhibited from lateral movement, at least in one direction, by a tab wall. When pin 231 falls into place in notch 101, tab 227 can be inhibited from lateral movement in another direction. Latch plate 30372 can optionally include keyed tab recess 239 that can be sized differently from tab recesses 235. The size difference can enable removable device 10080 to be positioned in a specific orientation. In some configurations, tab recesses 235 and, optionally, keyed tab recess 239 can be positioned at specific angular distances from horizontal line 253A through the center of latch plate 30372 that can, for example, distribute the force on the tab walls in a desired way, and to enable a specific amount of rotation required for pin 231 to be properly seated. In some configurations, if the desired rotation is approximately angle 241, then edge 247 of keyed recess 239 can be positioned at approximately angle 241 from diameter line 243A, edge 248 of tab 235A can be positioned at approximately angle 242 from diameter line 243A, and edges 251 and 249 of tabs 235C and 235B can be positioned at approximately ±angle 243A from diameter line 243A, respectively. For example, if the desired rotation is approximately 30°, then edge 247 of keyed recess 239 can be positioned at approximately 30° from diameter line 243A, edge 248 of tab 235A can be positioned at approximately 60° from diameter line 243A, and edges 251 and 249 of tabs 235C and 235B can be positioned at approximately +120° and −120°, respectively, from diameter line 243A. Latch plate 30372 can optionally include inserts 252 that can protrude from latch plate 30372, and can provide friction between latch plate 30372 and mount plate 30374. The friction can reduce rattle that can be generated as the mounting surface and the removable device move due to differing forces. Inserts 252 can be any length and thickness, depending on the desired rattle reduction.

Figure 5:
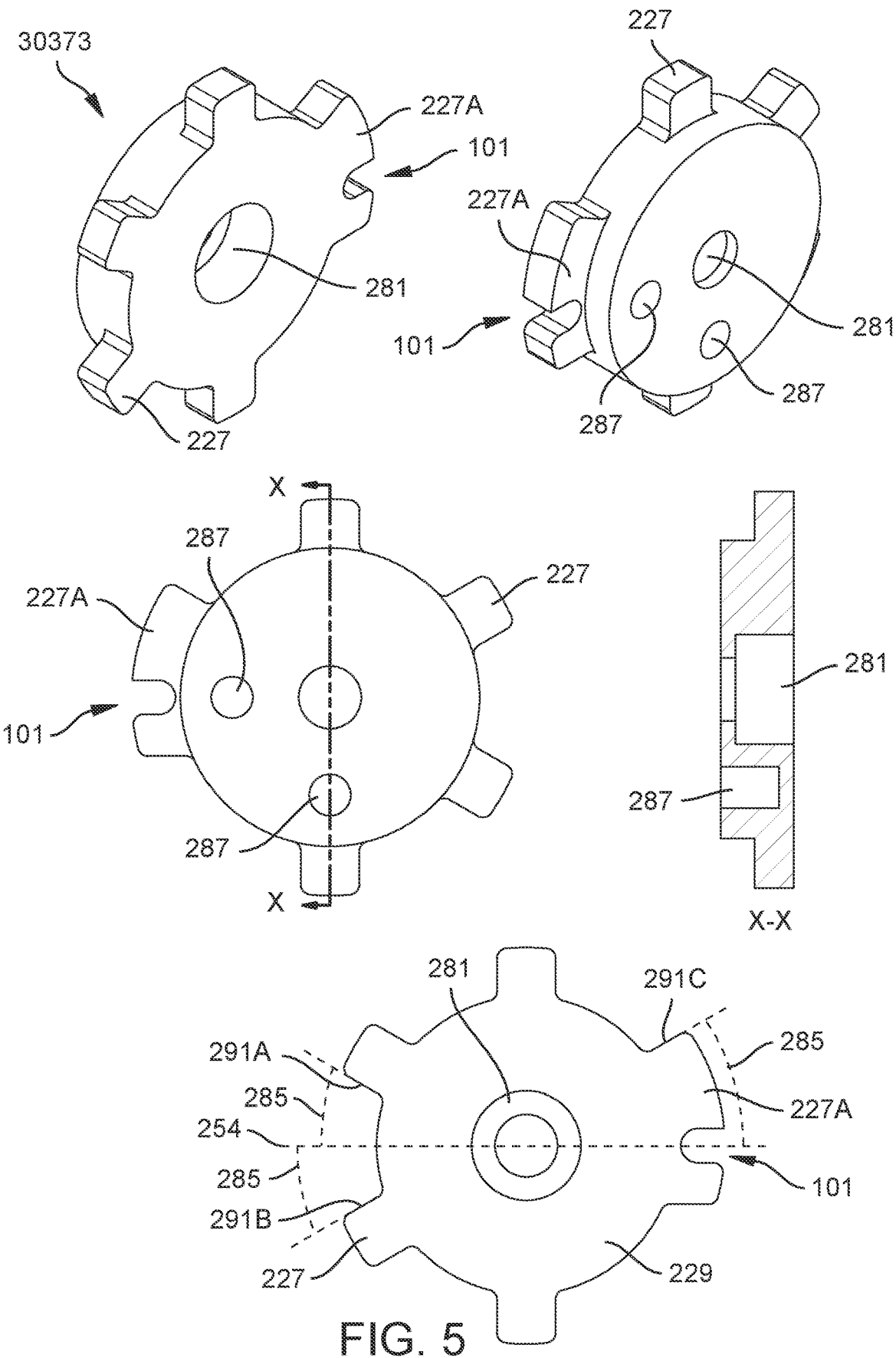
FIG. 5 is a group of perspective diagrams of the latch cog of the present teachings.

Referring now to FIG. 5, latch cog 30373 can provide the tabs to seat in latch plate 30372. Latch cog 30373 can be removably attached to mount plate 30374 at central recess 281. Alignment features 287 can provide alignment assistance when mating latch cog 30373 with alignment features 115 (FIG. 6) on mount plate 30374. Alignment features 287 can be positioned on latch cog 30373 based on the location of mount plate alignment features. Alignment features 287 can include recesses or protrusions. Latch cog 30373 can include tabs 227 that can be positioned according to the desired rotation angle to seat removable device 10080, as discussed herein with respect to latch plate 30372. In particular, to accomplish a seating rotation of angle 285, tab edge 291A can be positioned at about +angle 285 from diameter line 254, and tab edge 291B can be positioned at about −angle 285 from diameter line 254. If optional keyed tab 227A is present, keyed tab edge 291C can be positioned at +angle 285 from diameter line 254. Keyed tab 227A can include notch 101 that can receive pin 231 as removable device 10080 is seated with respect to mount plate 30374.

Figure 6:
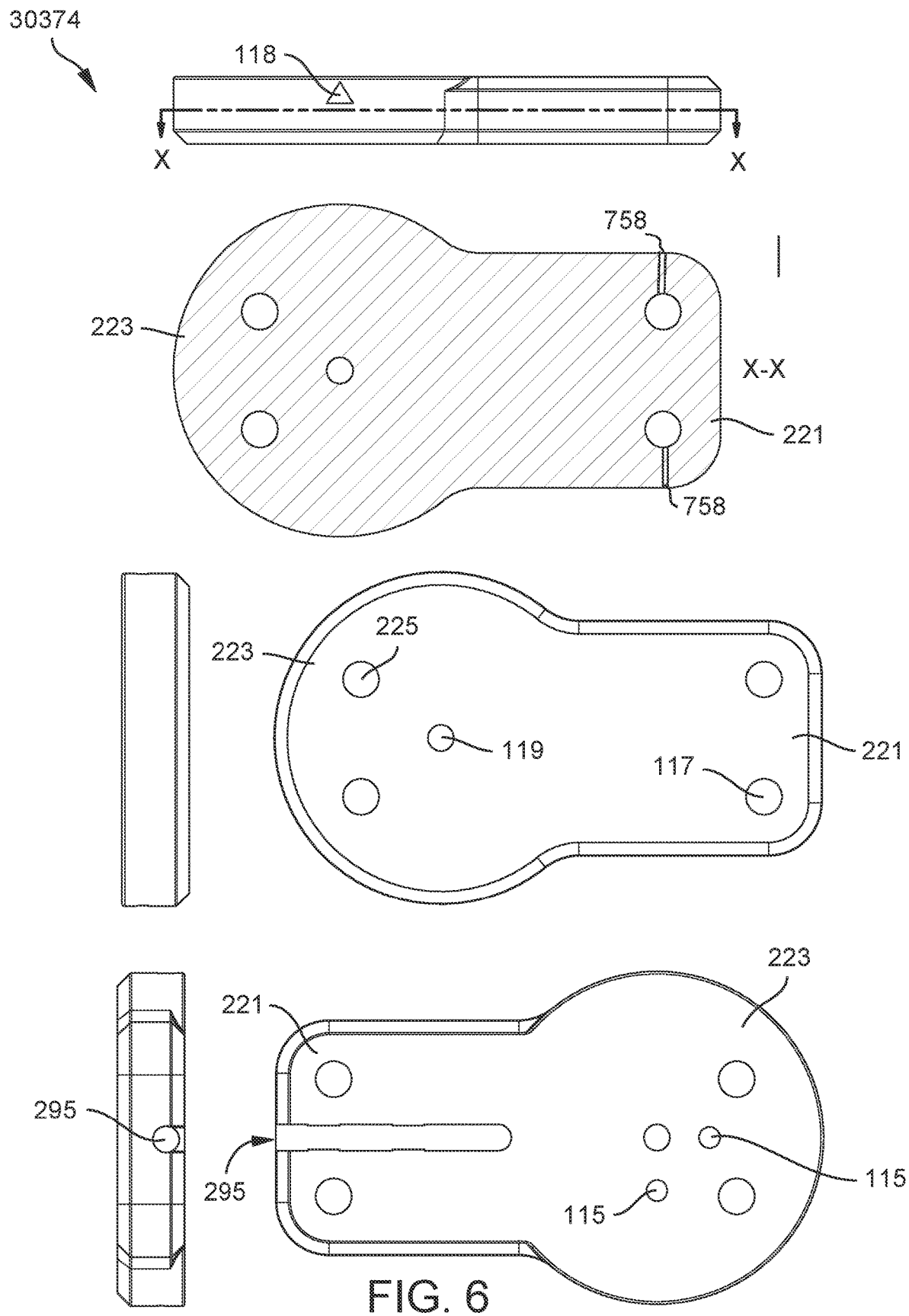
FIG. 6 is a group of perspective diagrams of the mount plate of the present teachings.

Referring now to FIG. 6, mount plate 30374 can provide the coupling between the mounting surface and the attachment means described herein to couple removable device 10080 with the mounting surface. Mount plate 30374 can include first end 221 and second end 223. First end 221 can be shaped to accommodate the mounting surface, and second end 223 can be shaped to accommodate removable device 10080, as referred to herein. First end 221 can optionally include wire recess 295 that can accommodate when removable device 10080 has a wired connection. Wire recess 295 can be any shape and size, such as, for example, but not limited to, wider and stretching across first end 221 side to side to accommodate a particular size of cabling, and longer or shorter, stretching or shrinking across first end 221 towards second end 223. The depth of wire recess 295 can vary depending on the size of the wire and the thickness of mount plate 30374. Wire recess 295 can optionally include a wire mount (not shown) that can be externally shaped to be mounted inside wire recess 295, and can be internally shaped to accommodate and tension-retain a wire of any size. Mount plate 30374 can include at least one mounting surface cavity 117/225 that can enable an operable coupling between the mounting surface and mount plate 30374. Mount plate 30374 can include at least one attachment cavity 119 that can enable an operable coupling between mount plate 30374 and latch cog 30373. Mount plate 30374 can include second alignment notch 118 described herein. Mount plate 30374 can optionally include mounting stabilization features such as, for example, but not limited to, setscrews frictionally coupled with mounting surface attachment means. The setscrews can be mounted, for example, in recesses 758.

Figure 7:
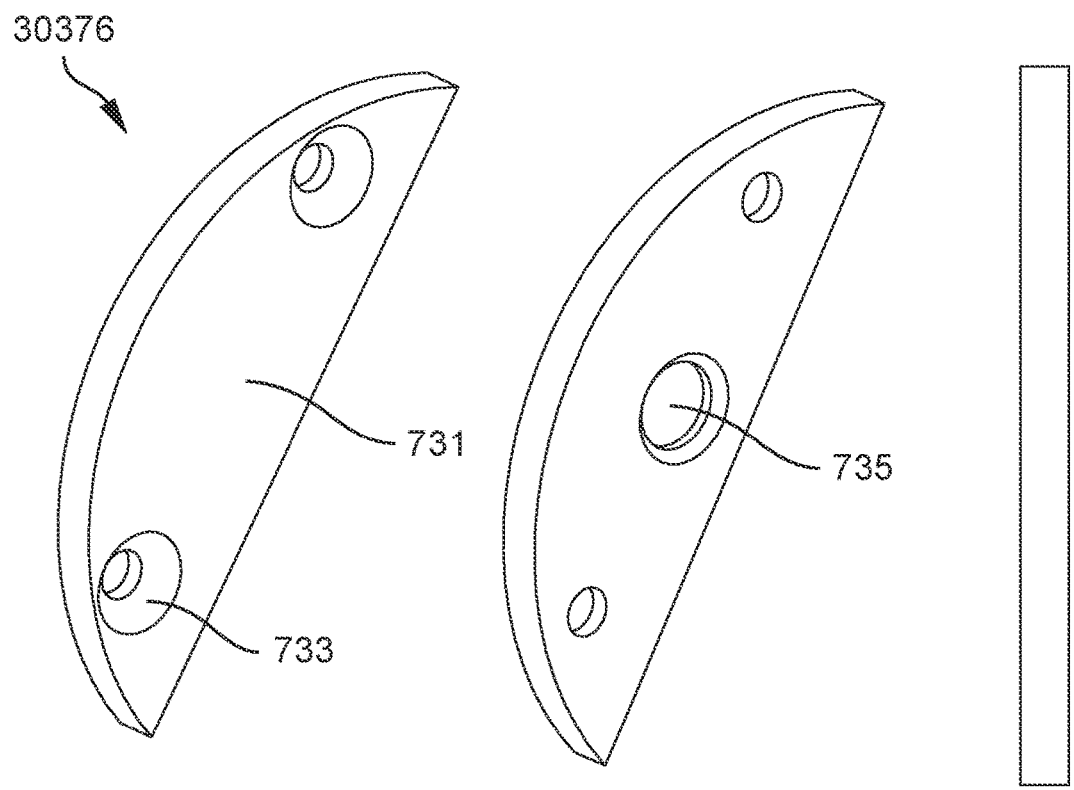
FIG. 7 is a group of perspective diagrams of the spring cap of the present teachings.
Figure 7:
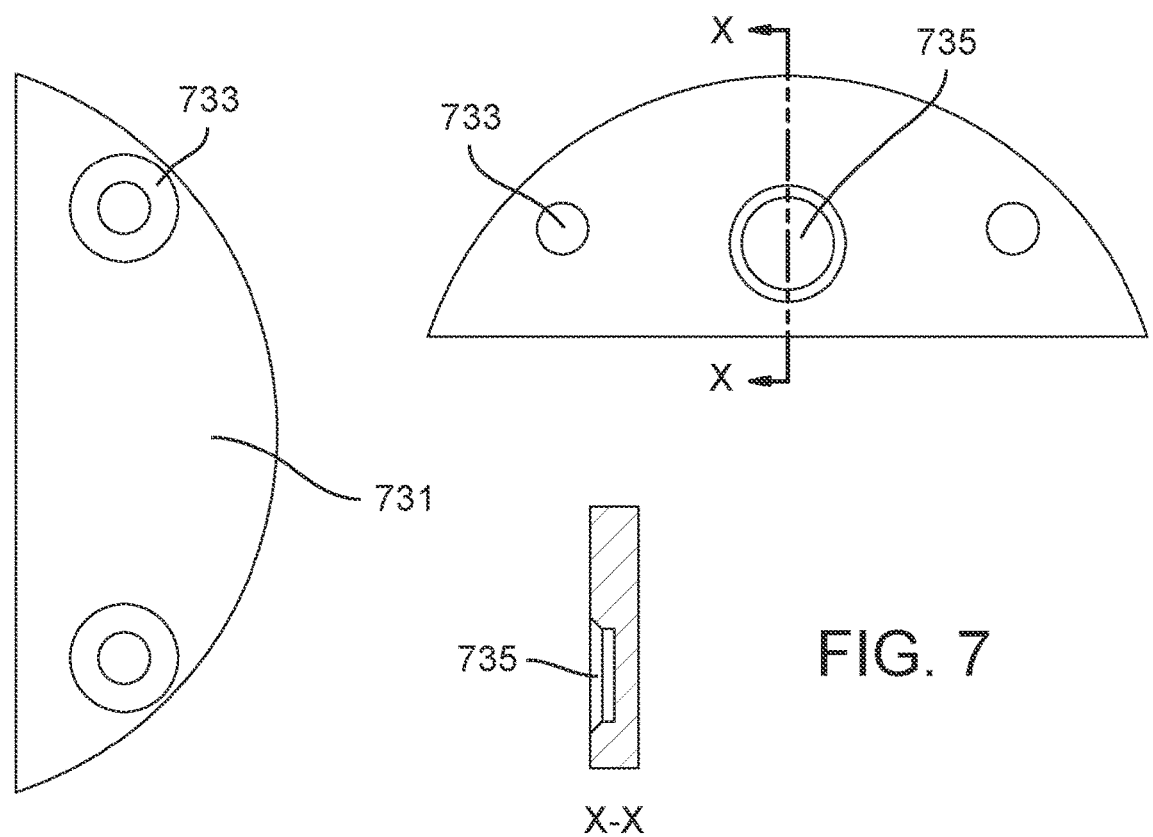

Referring now to FIG. 7, spring cap 30376 can couple top mount 30370 with removable device 10080, provide recess 735 against which spring 241 can apply pressure to removable device 10080, and provide surface interface 731 to which removable device 10080 can be removably attached. Recesses 733 can accommodate attachment of spring cap 30376 to top mount 30370.

Figure 8:
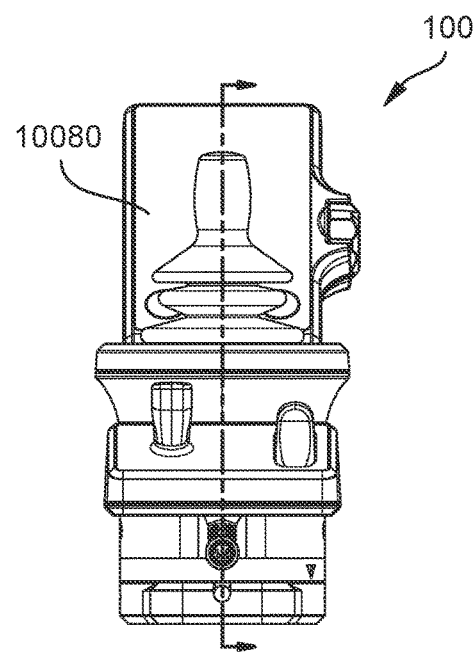
FIG. 8 is a cross-section diagram of the components of the quick release connector of the present teachings attached to a removable device.
Figure 8:
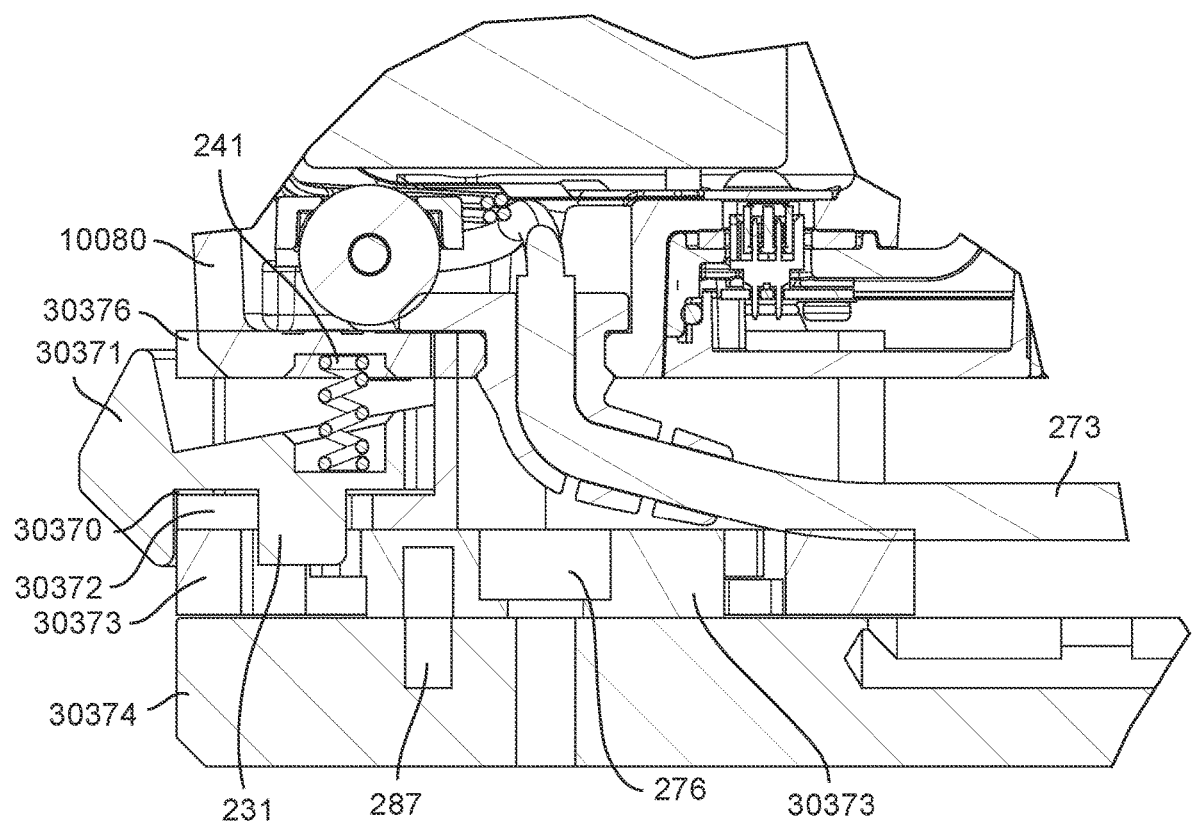

Referring now to FIG. 8, quick release connector 100 coupled with removable device 10080 is shown in cross section. Bolt 276 can couple latch cog 30373 with mount plate 30374. Alignment feature 287 can enable correct placement of latch cog 30373 on mount plate 30374, as discussed herein. Pin 231 can be seated in notch 101 through latch plate 30372 and top mount 30370. Spring cap 30376 can provide an interface between spring 241 and removable device 10080. Wire recess 295 can provide a conduit for wire 273.

Figure 9:
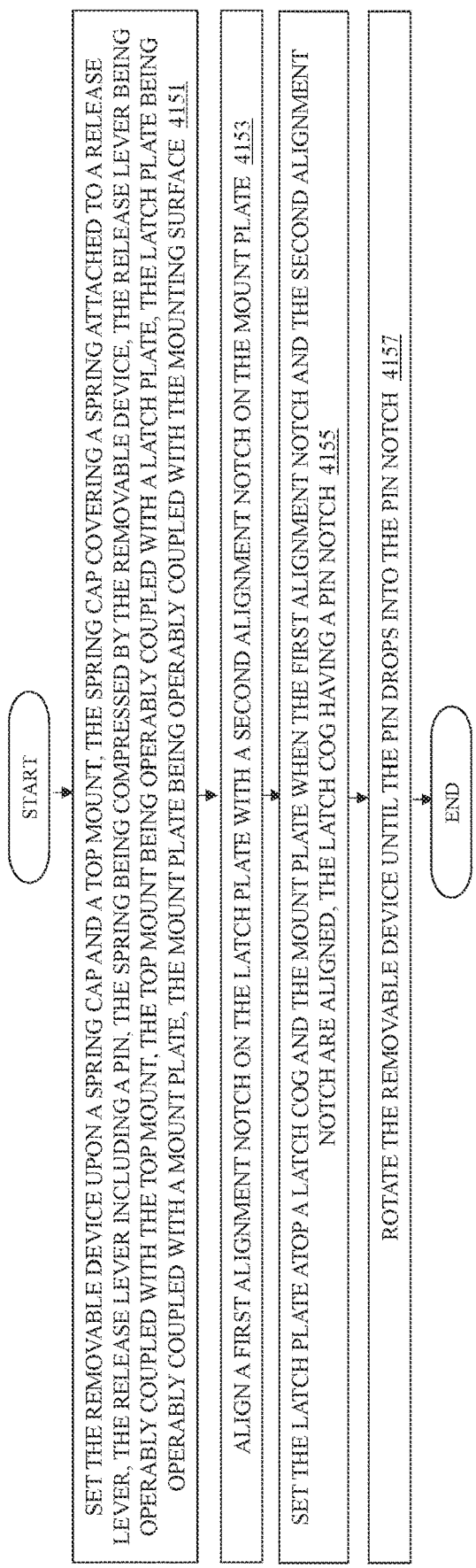
FIG. 9 is a flowchart of the method for coupling the quick release connector of the present teachings with a removable device.

Referring now to FIG. 9, method 4150 of the present teachings for coupling a removable device and a mounting surface using a quick release connector can include, but is not limited to including, setting 4151 the removable device upon a spring cap and a top mount. The spring cap can cover a spring attached to a release lever, and the release lever can include a pin. The spring can be compressed by the removable device, and the release lever can be operably coupled with the top mount. The top mount can be operably coupled with a latch plate, and the latch plate can be operably coupled with a mount plate. The mount plate can be operably coupled with the mounting surface. Method 4150 can include aligning 4153 a first alignment notch on the latch plate with a second alignment notch on the mount plate, and setting 4155 the latch plate atop a latch cog and the mount plate when the first alignment notch and the second alignment notch are aligned. The latch cog can include a pin notch. Method 4150 can include rotating 4157 the removable device until the pin drops into the pin notch. The rotating can optionally include about a 30° rotation.

Figure 10:
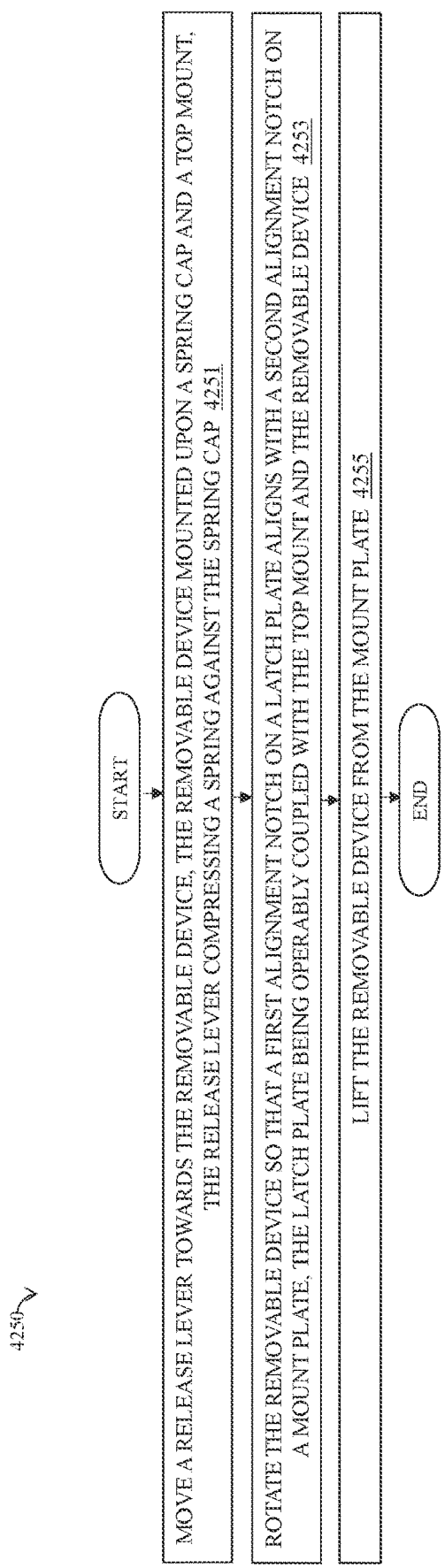
FIG. 10 is a flowchart of the method for decoupling the quick release connector of the present teachings with a removable device.
Figure 11B:
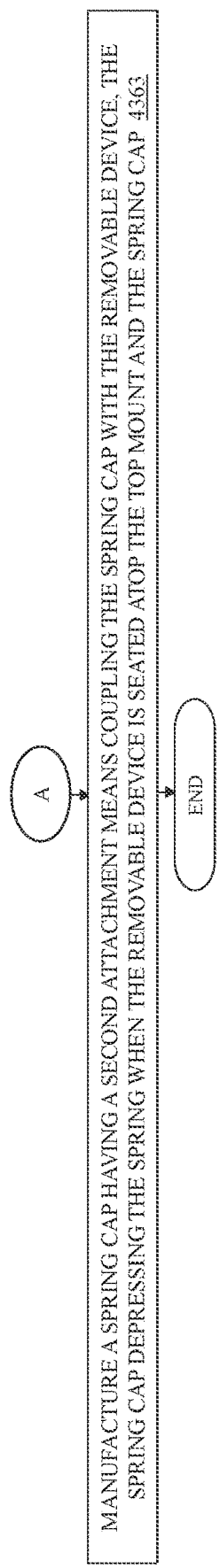
Figure 12:
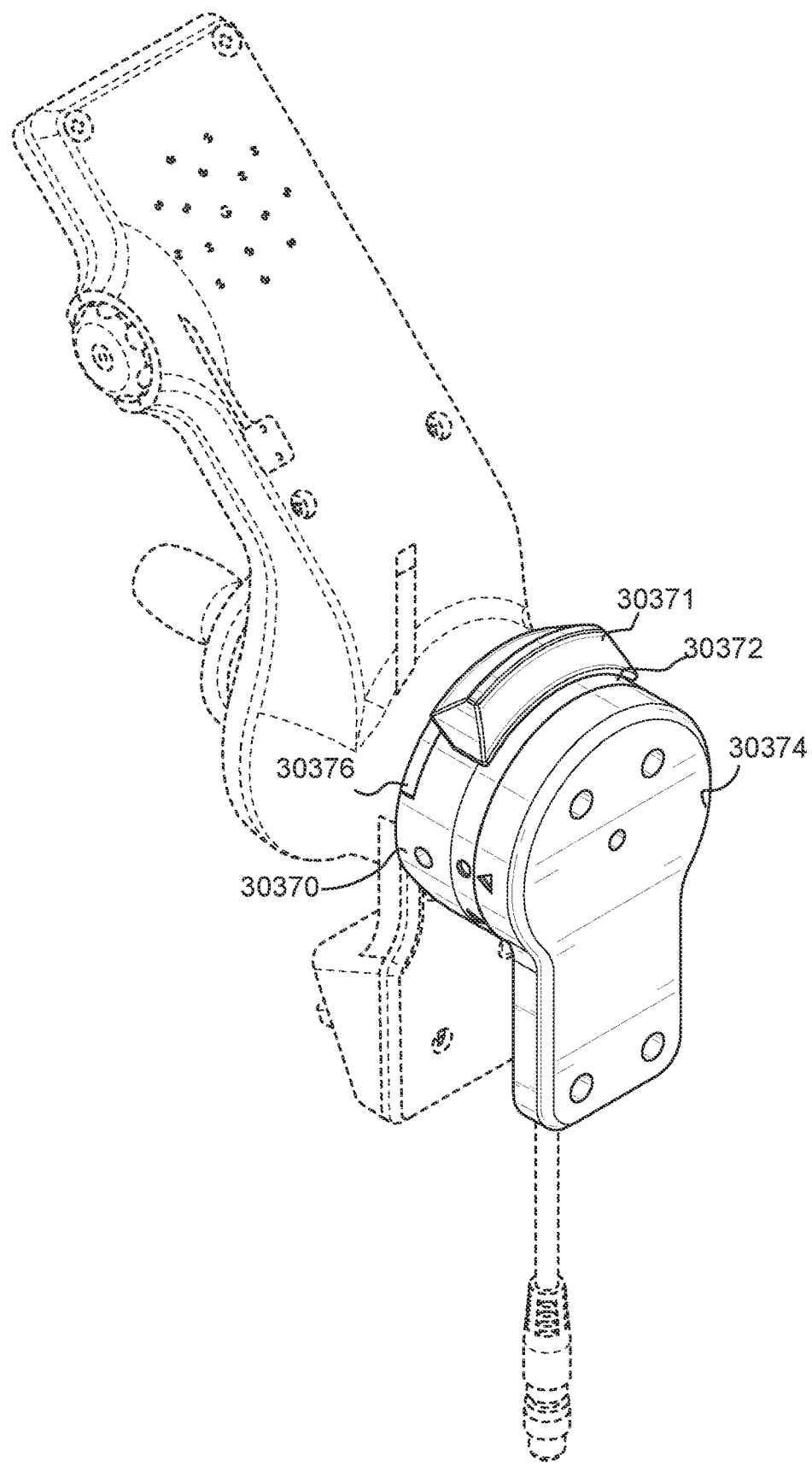
FIG. 12 is a perspective front side view of the quick release connector of the present teachings.
Figure 13:
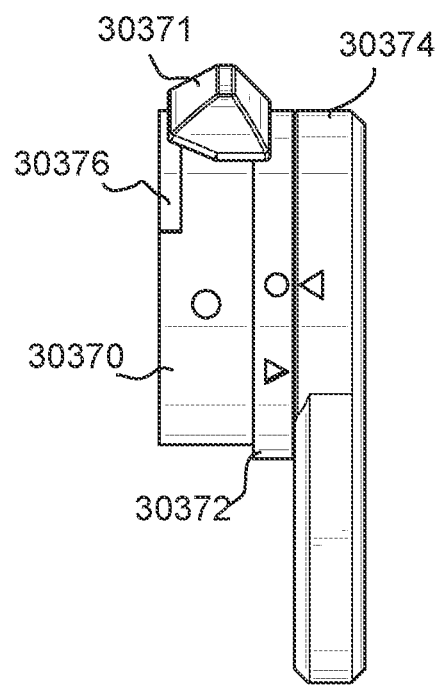
FIG. 13 is a right side view of the quick release connector of the present teachings.
Figure 14:
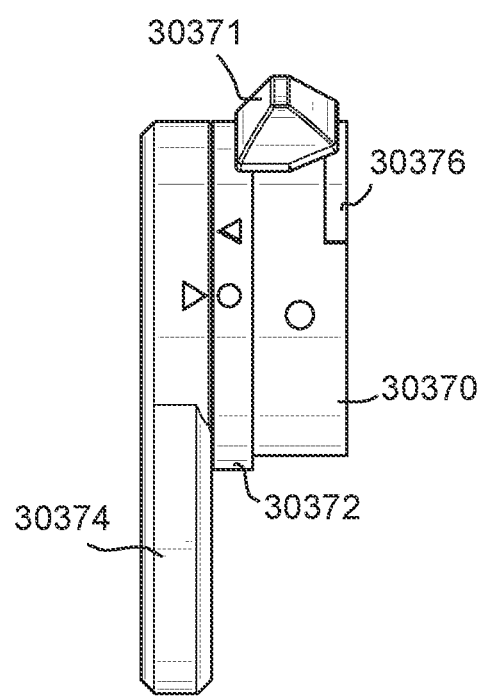
FIG. 14 is a left side view of the quick release connector of the present teachings.
Figure 15:
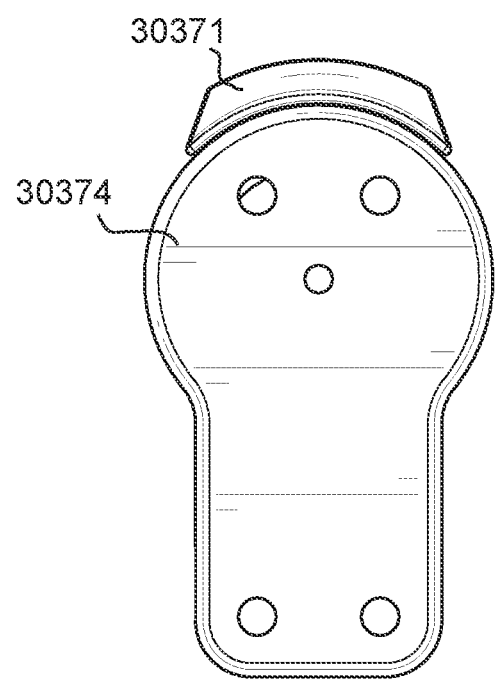
FIG. 15 is a bottom plan view of the quick release connector of the present teachings.
Figure 16:
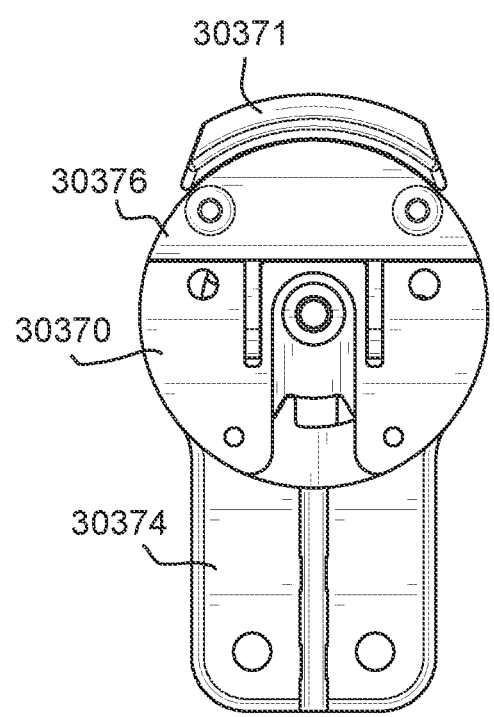
FIG. 16 is a top plan view of the quick release connector of the present teachings.
Figure 17:
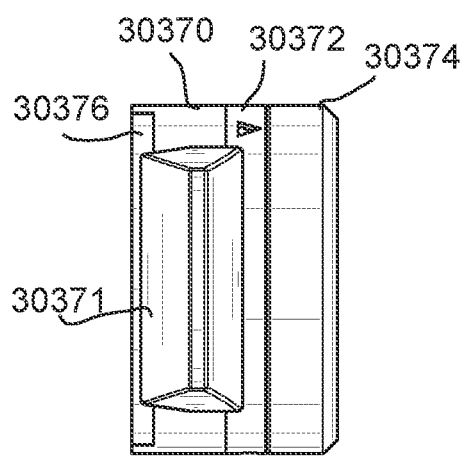
FIG. 17 is a rear view of the quick release connector of the present teachings.
Figure 18:
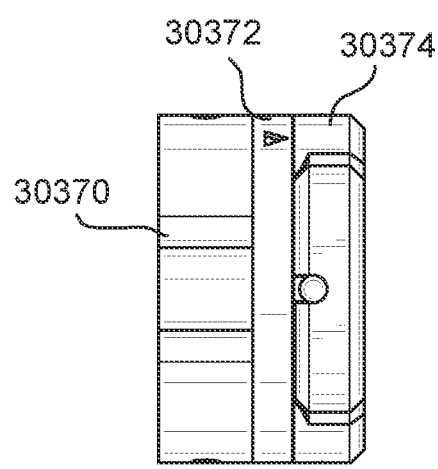
FIG. 18 is a front view of the quick release connector of the present teachings.

Referring now to FIG. 10, method 4250 for decoupling a removable device from a mounting surface using a quick release connector can include, but is not limited to including, moving 4251 a release lever towards the removable device. The removable device can be mounted upon a spring cap and a top mount, and the release lever can compress a spring against the spring cap. Method 4250 can include rotating 4253 the removable device so that a first alignment notch on a latch plate aligns with a second alignment notch on a mount plate. The latch plate can be operably coupled with the top mount and the removable device. Method 4250 can include lifting 4255 the removable device from the mount plate. The rotating can optionally include about a 30° rotation Referring now to FIGS. 11A-11B, method 4350 for building a quick release connector for coupling and decoupling a removable device from a mounting surface can include, but is not limited to including, manufacturing 4351 a mount plate with coupling means for operably coupling the mount plate with the mounting surface. The mount plate can include a first alignment notch, and can include a first end that can geometrically accommodate the mounting surface, and a second end that can geometrically accommodate the removable device. Method 4350 can include manufacturing 4353 a latch cog having a plurality of mount tabs surrounding a circular feature. At least one of the plurality of mount tabs can include a cog pin depression, and at least one of the plurality of mount tabs can be keyed to enable a pre-selected orientation of the removable device with respect to the mounting surface. Method 4350 can include removably coupling 4355 the latch cog to the second end, and manufacturing 4357 a latch plate having a plurality of recesses sized to accommodate the plurality of mount tabs. At least one of the plurality of recesses can include a plate pin depression, and at least one of the plurality of recesses can be keyed to accommodate the at least one keyed mount tab. Method 4350 can include manufacturing 4359 a release lever having a pin. The release lever can include a spring seated in a depression in the release lever, and the release lever can include a release lever body and coupling feet. Method 4350 can include manufacturing 4361 a top mount having a third pin depression. The top mount can geometrically accommodate the release lever body and the coupling feet. The coupling feet can be rotatably coupled to the top mount, and the top mount can include a first attachment means removably coupling the removable device to the top mount. Method 4350 can include manufacturing 4363 a spring cap having a second attachment means coupling the spring cap with the removable device. The spring cap can depress the spring when the removable device is seated atop the top mount and the spring cap.

Various alternatives and modifications can be devised by those skilled in the art without departing from the disclosure. Accordingly, the present disclosure is intended to embrace all such alternatives, modifications and variances. Additionally, while several example configurations of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular configurations. Moreover, those skilled in the art will envision other modifications within the scope and spirit of the claims appended hereto. Other elements, steps, methods and techniques that are insubstantially different from those described above and/or in the appended claims are also intended to be within the scope of the disclosure.

The drawings are presented only to demonstrate certain examples of the disclosure. Moreover, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third," and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the example configurations of the disclosure described herein are capable of operation in other sequences and/or arrangements than are described or illustrated herein.

The invention claimed is:

1. A quick release connector for coupling a removable device with a mounting surface, the quick release connector comprising:
   a mount plate with an opening for receiving a fastener for operably coupling the mount plate with the mounting surface, the mount plate including an alignment notch, the mount plate having a first end geometrically accommodating the mounting surface and the mount plate having a second end including geometrically accommodating the removable device;
   a latch cog having a plurality of mount tabs surrounding a circular feature, at least one of the plurality of mount tabs including a cog pin cavity, at least one of the plurality of mount tabs keyed to enable a pre-selected orientation of the removable device with respect to the mounting surface, the latch cog being removably coupled with the second end;
   a latch plate having a plurality of recesses sized to accommodate the plurality of mount tabs, at least one of the plurality of recesses having a plate pin cavity, at least one of the plurality of recesses keyed to accommodate the at least one keyed mount tab;
   a release lever having a pin, the release lever having a spring seated in a spring depression in the release lever, the release lever having a release lever handle and coupling feet; and
   a top mount having a third pin depression, the top mount geometrically accommodating the release lever handle and the coupling feet, the coupling feet being rotatably coupled to the top mount, the top mount including a first attachment cavity removably coupling the removable device to the top mount.

2. The quick release connector as in claim 1 wherein the mount plate comprises a wire channel.

3. The quick release connector as in claim 1 wherein the top mount comprises a wire channel.

4. The quick release connector as in claim 1 wherein the mounting surface comprises a seat arm.

5. The quick release connector as in claim 4 wherein the mounting surface comprises a wheelchair component.

6. A method for building a quick release connector for coupling and decoupling a removable device from a mounting surface, the method comprising:
   manufacturing a mount plate with coupling means for operably coupling the mount plate with the mounting surface, the mount plate including a first alignment notch, the mount plate having a first end geometrically accommodating the mounting surface and the mount plate having a second end geometrically accommodating the removable device;
   manufacturing a latch cog having a plurality of mount tabs surrounding a circular feature, at least one of the plurality of mount tabs including a cog pin depression, at least one of the plurality of mount tabs keyed to enable a pre-selected orientation of the removable device with respect to the mounting surface;
   removably coupling the latch cog to the second end;
   manufacturing a latch plate having a plurality of recesses sized to accommodate the plurality of mount tabs, at least one of the plurality of recesses having a plate pin depression, at least one of the plurality of recesses keyed to accommodate the at least one keyed mount tab;
   manufacturing a release lever having a pin, the release lever having a spring seated in a depression in the release lever, the release lever having a release lever body and coupling feet; and
   manufacturing a top mount having a third pin depression, the top mount geometrically accommodating the release lever body and the coupling feet, the coupling feet being rotatably coupled to the top mount, the top mount including a first attachment means removably coupling the removable device to the top mount.

7. The method as in claim 6 wherein the mount plate comprises a wire channel.

8. The method as in claim 6 wherein the top mount comprises a wire channel.

9. The method of claim 6 wherein the mounting surface comprises a wheelchair surface.

* * * * *